June 27, 1967    A. P. LIMBACH    3,327,350
APPARATUS FOR PARISON PROGRAMMING
Filed Sept. 30, 1964
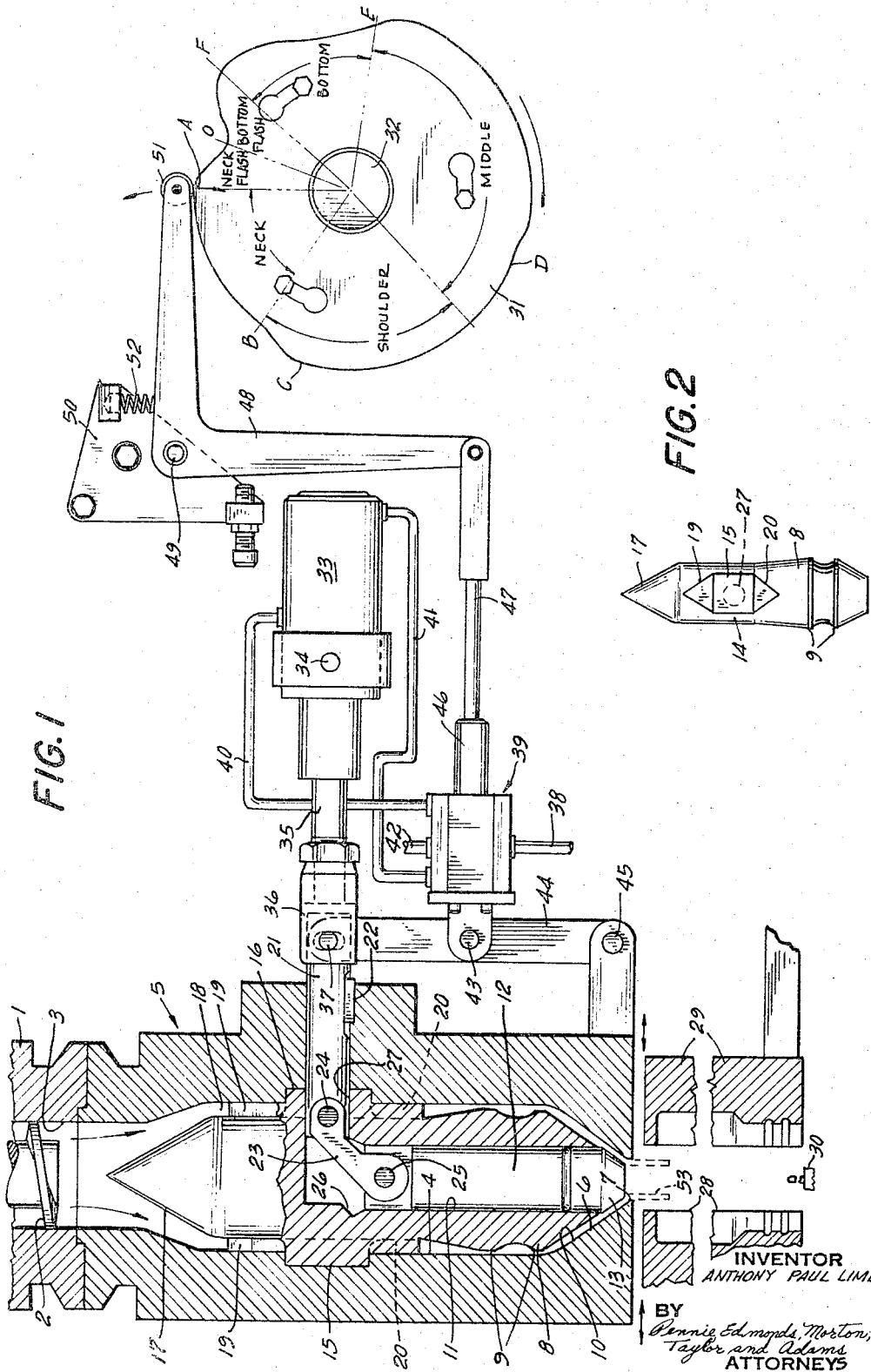
INVENTOR
ANTHONY PAUL LIMBACH
BY
Pennie, Edmonds, Morton,
Taylor and Adams
ATTORNEYS 3,327,350
APPARATUS FOR PARISON PROGRAMMING
Anthony Paul Limbach, Somerset, N.J., assignor to Sterling Extruder Corporation
Filed Sept. 30, 1964, Ser. No. 400,361
4 Claims. (Cl. 18—14)

This invention relates to blow molding apparatus and more particularly to apparatus for varying the thickness of the hot plastic tube called a parison as it is extruded from the parison die head. Such variation in thickness is carried out according to a predetermined plan or program so as to vary the thickness of the several portions of the parison according to the requirement of the various parts of the article to be molded.

The variation in thickness of the parison is produced by changing the lip gap of the die head. Change in the lip gap is brought about by changing the position of an inner or movable mandrel or center pin axially with respect to the die head. Heretofore the change in the position of the movable mandrel has been brought about by devices which operate in a direction parallel to the axis of the mandrel. Consequently, it was necessary to feed heat-softened plastic to the die head from the side. With such arrangement the plastic on its way from the extruder to the die head must change its direction of flow by an angle of 90°, and it has been found impossible to avoid having stagnant areas in the path of flow. In such areas the advance of the heat-softened plastic material is retarded to a greater or less extent, thus subjecting the material for an extended period to the action of the heating devices which surround the path of flow. When certain types of thermoplastic materials are thus subjected to a comparatively high temperature for too long a time the composition of the material is degraded, and an inferior molded product results.

The purpose of the present invention is to overcome this difficulty. The parison die head is constructed and arranged to eliminate pockets in which the heat-softened plastic might degrade. Advantageously the die head is placed in lengthwise alignment with the extruder. The die head is provided with an outer fixed mandrel and with an inner mandrel which is movable lengthwise of the die head for varying the lip gap. A mandrel operating shaft extends into the die head at right angles to the movable mandrel, and means are provided to interconnect the inner ends of this shaft and mandrel. The operating shaft is actuated according to the desired parison program and the interconnecting means includes mechanism for transmitting the movement of the operating shaft to the mandrel to effect the desired axial movement thereof. Advantageously the operating shaft is moved lengthwise and this motion is imparted by means of the piston of a hydraulic cylinder. Hydraulic fluid under suitable pressure is supplied through an appropriate control valve to admit and discharge fluid from the opposite ends of the cylinder as required. The operation of this control valve is monitored by a program cam, the shape of which has been laid out according to the variations in parison thickness desired for the particular article to be produced, such as for example a bottle.

The invention will be better understood from a consideration of the detailed description which follows the description of the drawing figures. In these figures:

FIGURE 1 shows diagrammatically the extruder die head and mold in transverse vertical section, and the programming mechanism in side elevation; and FIGURE 2 is a side view of a detail.

Referring to the drawings, the extruder is indicated at 1 and the plasticizing screw thereof at 2. These parts are shown as operating in vertical position, and the bore 3 of the extruder is in axial alignment with the cylindrical cavity 4 of the die head 5 which is also in vertical position. The die head and extruder are secured together by any conventional means (not shown).

At the lower end of die head 5 the cylindrical cavity 4 terminates in a tapering surface 6 in the form of an inverted truncated cone, and at the lower end of this surface is a circular die opening 7. Within the lower portion of cavity 4 there is a stationary mandrel 8 having a conventional pressure producing and mixing formation 9 on its outer surface and having a tapering lower end portion 10 which is suitably spaced from the tapering surface 6.

Fixed mandrel 8 has a central bore 11 within which slides an axial movable inner mandrel 12. This is in the form of a cylindrical member having a tapered lower end portion 13 which cooperates with the tapered formation 6 and the die exit 7 to control the thickness of the parison extrusion opening.

Fixed parison 8 comprises the lower portion of an elongated and generally cylindrical member 14 which is shown in FIG. 2 in side view looking from the left of FIG. 1. Member 14 has two rectangular projections 15 and 16 arranged diametrically opposite one another which serve to support member 14 in the cylindrical cavity 4 of the die head. For this purpose projections 15 and 16 are received in recesses shown in FIG. 1 in the wall of cavity 4.

Cylindrical member 14 extends to the upper part of cavity 4 and terminates in a conical portion 17 for the purpose of spreading the flow of the plastic shortly after it enters the die head. Cylindrical member 14 is sufficiently smaller in diameter than the diameter of cavity 4 to leave an annular flow space 18 surrounding member 14. In order to streamline the flow of the plastic around the rectangular projections 15 and 16, each projection is provided with tapering deflecing members 19 and 20 arranged on the leading and trailing ends respectively of the projections 15 and 16. Deflecting members 19 and 20 are shown as integral extensions of the projections 15 and 16 and their outer surfaces are curved to correspond with the interior cylindrical surface of cavity 4.

The heat-softened plastic material can therefore flow from the extruder 1 downwardly into the upper end portion of cavity 4 of the die head, thence spreading outwardly around the conical portion 17 meeting the pointed tips of the two deflecting members 19 and 20 which guide the plastic smoothly around the sides of the two supporting projections 15 and 16. Passing these projections the two streams again widen and flow towards the restricted areas of the pressure producing and mixing formations 9, and thence downwardly around the parison 8 and through the die opening 7.

In order to provide for side operation of the movable mandrel 12, a shaft 21 is arranged to slide in an opening or bore extending into the interior of cylindrical cavity 4 from the right side of die head 5. This shaft is prevented from rotation by means of a key 22 or in any other convenient manner. The inner end of shaft 21 and the upper end of inner mandrel 12 are bifurcated and an angular link 23 is connected at its opposite ends to these bifurcated portions by means of cross pins 24 and 25.

When operating shaft 21 is moved inwardly link 23 causes movable mandrel 12 to move downwardly thereby reducing the extrusion opening at the bottom of the die head 5. Movement of shaft 21 outwardly causes the mandrel to rise and its upward motion is limited at a point 26 on an angular surface formed in the wall of the bore 11. The range of operation of link 23 is thus maintained in the vicinity of the common angle of 45° with respect to the two members 21 and 12. Operating shaft 21 is guided by the bore in die head 5 and enters the upper end of bore 11 in member 14 through a circular opening 27 in the right hand supporting projection 15.

As the parison is extruded from the die opening 7 it is received between the blow mold sections 28 and 29 which are shown broken away. After the complete parison has been extruded these mold sections close automatically around the parison. Blowing air under suitable pressure is then admitted through blow tube 30 to inflate the parison and cause it to conform to the shape of the mold sections, in this instance shown in the form of an inverted bottle having a threaded neck.

As shown in FIG. 1, the movement of operating shaft 21 takes place under the direction of program cam 31 which is removably mounted by means of the three bolts indicated on a disc at the rear of the cam which is fixed to and rotated by shaft 32. Shaft 32 is operatively connected with the mechanism for opening and closing the mold sections 28 and 29 in such a way that the cam is caused to make one complete revolution for each complete actuation of the mold sections and therefore once for the extrusion of each parison.

A hydraulic cylinder 33 is mounted by means of gimbals 34 in approximate alignment with operating shaft 21 and its piston rod 35 is connected with shaft 21 by means of a clevis 36 and a cross pin 37. Fluid under pressure for operating cylinder 33 is supplied through a line 38 to a pilot valve 39, this valve being connected to the opposite ends of the cylinder by tubes 40 and 41. An exhaust line is indicated at 42.

The body of pilot valve 39 is connected by means of a pin 43 to an upright lever 44 which has a fixed pivot 45 at its lower end and which is connected at its upper end to pin 37 and clevis 36. The spool 46 of the pilot valve is connected through a link 47 to the lower end of a bell crank lever 48 which is pivoted at 49 to a fixed bracket 50. The right end of bell crank 48 carries a roller 51 which follows the surface of program cam 31, being held against it by means of a compression spring 52.

In operation, as program cam 31 rotates in the direction of the arrow, motion in one direction or the other is imparted to link 47 and spool 46. Thus pressure fluid is admitted to one end of cylinder 33 and discharged from the opposite end. This causes a movement of piston rod 35 which, in turn, through lever 44, produces a movement of the body of pilot valve 39 which closes off the pressure fluid supply and stops the motion of piston rod 35 which has been transmitted to the movable mandrel 12.

As program cam 31 rotates from zero position it first causes the positioning of movable mandrel 12 to extrude the neck flash portion of the parison which is indicated by dotted lines at 53 in FIG. 1. As the operation of the extruder continues and the rotation of cam 31 continues mandrel 12 is positioned to increase the thickness of the parison to form the portion thereof which is to produce the neck of the bottle.

From the point A of cam 31 to the point B the die opening remains constant. At point B follower roller 51 is raised by the change in the cam shape and elevated to the point C. This increases the die opening to thicken that portion of the parison which is to form the shoulder of the bottle. This thickness continues not only through the formation of the shoulder but to the point D where a portion of the parison for the middle of the bottle has been formed. Then the change in position of the follower roller 51 causes a slight further enlargement of the die opening so as to thicken the parison somewhat through the remainder of the formation of that portion which is to form the middle of the bottle. This is complete at the point E on cam 31 and variation in the parison thickness continues from the point E to the point F during the formation of the parison portion which is to constitute the bottom of the bottle, and from the point F back to the zero point the thickness is greatly reduced since the bottom flash section of the parison requires very little plastic.

It will be understood that by suitably laying out the shape of the program cam 31 the thickness of the parison at various portions throughout its length can be varied as desired to meet the requirements of any particular bottle or other object which is to be blow molded.

I claim:

1. A parison die head constructed and arranged to eliminate pockets in which the heat-softened plastic can degrade, said die head having outer and inner mandrels, the inner mandrel being movable lengthwise of the die head for varying the lip gap of the die head, a lengthwise movable mandrel operating shaft extending into the die head at right angles to the movable mandrel, means interconnecting the inner ends of the shaft and mandrel, and means for causing lengthwise movement of the operating shaft, said interconnecting means including means for transmitting said lengthwise movement of the operating shaft to said mandrel to effect axial movement thereof.

2. In blow molding apparatus, an extruder, a parison die head in lengthwise alignment with the extruder and having outer and inner mandrels, the inner mandrel being movable lengthwise of the die head for varying the lip gap of the die head, a lengthwise movable mandrel operating shaft extending into the die head at right angles to the movable mandrel, means interconnecting the inner ends of the shaft and mandrel, and means for causing lengthwise movement of the operating shaft, said interconnecting means including means for transmitting lengthwise movement of the operating shaft to said mandrel to effect axial movement thereof.

3. In blow molding apparatus, an extruder, a parison die head in lengthwise alignment with the extruder and having outer and inner mandrels, the inner mandrel being guided for lengthwise movement in an aperture in the outer mandrel for varying the lip gap of the die head, a mandrel operating shaft guided for sliding movement in an aperture extending into the side of the die head at right angles to the movable mandrel, an angular link member pivotally interconnecting the inner ends of the shaft and inner mandrel, and parison programming mechanism for causing sliding lengthwise movement of said side operating shaft.

4. Blow molding apparatus as set forth in claim 3 wherein the parison programming mechanism includes power operated mechanism connected to impart axial movement to the side operating shaft, and a program cam for controlling the power operated mechanism.

References Cited

UNITED STATES PATENTS

| 3,186,032 | 6/1965 | Harwood | 18—14 |
| 3,205,534 | 9/1965 | Langecker | 18—14 |
| 3,218,672 | 11/1965 | Langecker | 18—14 |
| 3,262,152 | 7/1966 | Fogebberg et al. | 18—5 |

FOREIGN PATENTS 918,946  2/1963  Great Britain.

WILLIAM J. STEPHENSON, *Primary Examiner.*

WILBUR L. McBAY, *Examiner.*